May 26, 1936.  A. W. LOY  2,041,719

PRISMOSTEREOPHOROMETER

Filed Oct. 14, 1932    2 Sheets-Sheet 1

A. W. Loy
INVENTOR

BY Robert A. Lavender
ATTORNEY

May 26, 1936.   A. W. LOY   2,041,719
PRISMOSTEREOPHOROMETER
Filed Oct. 14, 1932   2 Sheets-Sheet 2

A.W. Loy
INVENTOR

BY
Robert A. Lavender
ATTORNEY

Patented May 26, 1936

2,041,719

UNITED STATES PATENT OFFICE 2,041,719

PRISMOSTEREOPHOROMETER

Arthur W. Loy, United States Navy, Vallejo, Calif.

Application October 14, 1932, Serial No. 637,721

13 Claims. (Cl. 88—20)

(Granted under the act of March 3, 1883, as amended April 30, 1928; 370 O. G. 757)

This invention provides a method of, and an apparatus for the measuring of depth perception, and it also provides a means for stimulating the retina so that depth perception may be increased in a subject, a result of considerable value, as will be pointed out hereinafter.

With the above and other objects in view, the invention consists in the construction, combination and arrangement of parts as will be described more fully hereinafter.

Depth perception is, briefly, a visual sense of the third dimension. With the advent of rapid transportation and aviation, the importance of a keen sense of the third dimension has been greatly increased. It is necessary to measure accurately the aviator's depth perception, and if it is deficient, it is desirable to stimulate it until it becomes highly developed. Depth perception is keenest in the immediate vicinity of the macula, or the central retinal area, and it becomes less acute toward the periphery. The aviator relies upon peripheral vision for information as to the lead of the plane in the vertical and the horizontal, and as to the rotation of the plane, involving the factor of depth perception. The highly developed depth perception of the aviator is above the normal for terrestrial man, and this invention provides a means for stimulating and developing this "above normal" attribute.

Obviously the invention has utility outside of aviation.

There are several factors recognized as contributing to depth perception, as (1) terrestrial association, (2) motion parallax, (3) aerial perspective, (4) size of retinal image, (5) accommodation, (6) binocular parallax, (7) convergence, and (8) physiological diplopia. With the first five of these factors the invention is not concerned, except to eliminate them so that they will not have a confusing effect upon the factor of finer depth perception, to which the invention is directed.

Inasmuch as the invention is based upon certain discoveries that I have made in the field of study of depth perception, it is desirable to give briefly the accepted theory of depth perception as it existed prior to my work. As an example, if the eyes are fixed upon a given point, the rays of light from the point to each eye fall upon the macula, or the central retinal area of each retina, respectively. If the point is at a finite distance, the fixation of the eyes upon the point establishes an horopter. The horopter is the surface of a sphere all points of which are equidistant from the retinae of the observer, and which contains the point upon which the observer's eyes are fixed. The observer sees a single image of the point upon which his eyes are fixed. He also sees a single image of any other point on the horopter. The rays of light from such another point do not fall upon the maculae of the retinae, because the eyes are fixed upon the first point, but they do fall upon corresponding retinal areas, an anatomical term designating retinal areas which are in the same position in relation to the central retinal areas, on the two retinae. Thus, the horopter was defined as the surface of a sphere, which was the locus of all points, the rays from which fall upon corresponding retinal areas to produce single vision.

When the eyes are fixed upon a point at a finite distance, the eyes are converged upon the point, giving rise to the above mentioned factor of "convergence", and this factor varies inversely with the distance of the point. Single vision was associated only with points on the horopter, and for any other point not on the horopter, whether nearer or more distant than the horopter, physiological diplopia, or double vision, existed. For points nearer than the horopter, there was crossed diplopia; that is, the projected images of such points were crossed in the visual field. For points beyond the horopter, there was uncrossed diplopia; that is, the projected images of the point were uncrossed in the visual field. Diplopia was due to parallactic angle of the point, in relation to the two retinae, and the condition was designated as the binocular parallax. Heretofore, the accepted theory of depth perception was explained in terms of binocular parallax, convergence, and diplopia, and, in particular, to the muscular effort incident to these factors.

I have found that this theory is in error in teaching that diplopia exists for any point not on the horopter, as above defined. I have discovered that there is a zone lying adjacent to the spherical surface, heretofore called the horopter, and on either side thereof, in which there is no diplopia. Although there is no diplopia, and no change in the convergence of the eyes, there is keen depth perception for points in this zone. It is to be noted that it is in this zone that keen depth perception is of greatest value. Obviously a theory that explains depth perception in terms of diplopia and convergence fails for points within this most important zone. It can no longer be said that rays of light from an object must fall upon corresponding retinal areas or diplopia will exist. If now, we define the horopter as the locus of all points with which single vision is associated, the horopter becomes, not a spherical surface, but a spherical zone, having a substantial dimension in the radial direction.

Following the line of investigation thus opened, I have discovered that instead of muscular effort incident to diplopia, it is "specific nerve energy" that plays the important role in depth perception for the points within the zonal horopter. By specific nerve energy, is meant the function of a nerve that serves to localize a stimulus; that is, it serves to convey to consciousness the information as to where the stimulus is acting. For example, when the arm is pricked with a needle, specific nerve energy tells at what point the needle has pricked the arm. Since the relation between specific nerve energy and depth perception lies at the bottom of the present invention, this relation, as determined by my research, will be explained in detail.

In nature, the human eyes have developed with the visual axes in the same plane. The visual axis of the eye is a straight line passing from the central retinal area through the center of the pupil. There is a visual axis for each eye. With the head erect and the eyes straight forward, the visual axes determine a horizontal plane, but this plane may assume any position, depending upon the position of the eyes, and the head. It is the position of this plane, relative to the retinae, that is important. It can be seen that this plane passes through the central retinal areas and also through a zone of retinal areas laterally disposed on either side of the central retinal area.

I have found that the retinal areas of the two eyes, lying in this zone, are peculiarly related one to another. Similarly, other retinal areas of the two eyes, lying in zones parallel to the first mentioned zone, are peculiarly related, one to another, within their respective zones; but this relationship does not exist between areas of different zones. This relationship is the result of natural development and arises from the fact that images of a point in space fall upon retinal areas, of the two eyes, which lie in the same zone.

The nervous connections formed for the association of the corresponding retinal areas has long been recognized. I have found that nervous connections have formed for the association of non-corresponding retinal areas, provided that they lie in the same zone, parallel to the zone of the central retinal areas. There is no such association of non-corresponding retinal areas that lie in different zones.

Images of a nearer point fall upon retinal areas that are more widely separated on the two retinae than are the retinal areas that receive images from a more distant point. The above mentioned nervous connections, formed for the association of retinal areas within the same zone, and, more particularly, the "specific nerve energy" incident thereto, provides a fine sense of retinal localization for the detection of the wider separation of the retinal images for the nearer points as compared to the lesser separation of the retinal images from more distant points; thus affording the fine stereoptical vision, or the fine perception of depth, which is peculiar to binocular vision. Thus, if the ray of light from a point to one eye only be displaced by a prism, while the ray of light from the same point to other eye remains undisturbed, and the displacement be parallel to the plane of the visual axes (i. e. along the zone above mentioned) so as to separate more widely the two retinal images of the point, the point will appear to move to a position nearer to the observer. Conversely, if the displacement is such that the two retinal images are brought nearer together (but remain in the same zone), the point will appear to move to a position at a greater distance from the observer. If, however, the prism displaces the ray to a retinal area in a different zone, diplopia appears and depth perception is lost.

As has been mentioned above, depth perception is keenest in the immediate vicinity of the macula, but I have found that with a suitable apparatus for displacing the rays of light, in the manner generally discussed above, the specific nerve energy and depth perception can be stimulated and developed through suitable exercises.

Having discussed the theory underlying this invention, its details will now be described. Whenever specific dimensions are mentioned, they are to be understood as not being essential but merely indicative of those values that I have found it most convenient to employ.

Figure 1:
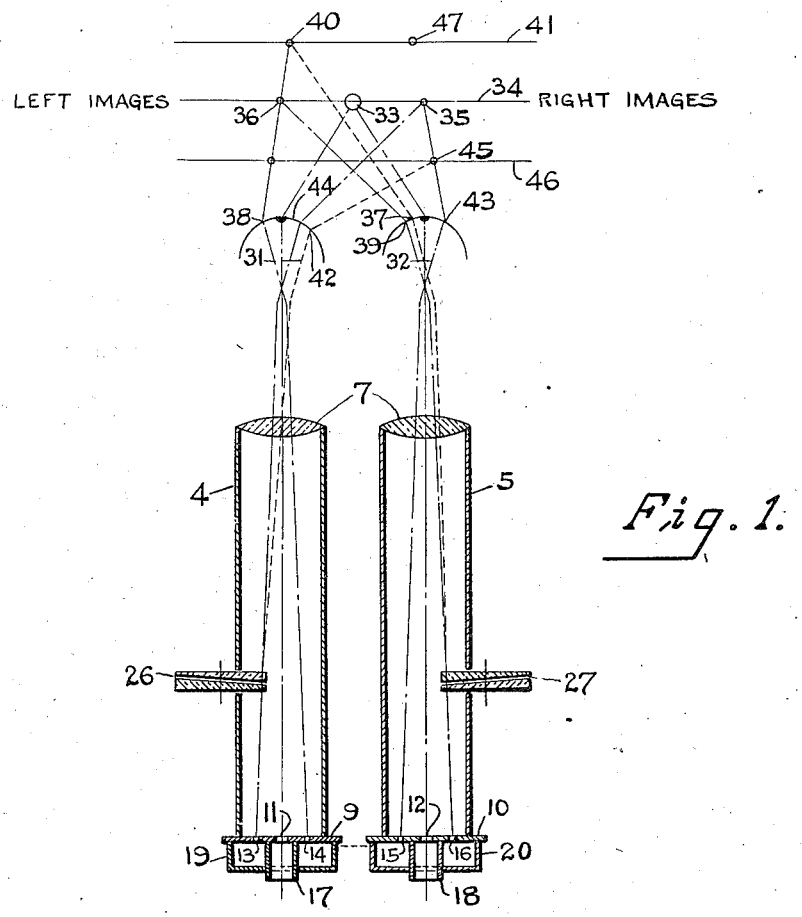
Figure 1 is a schematic drawing of the instrument and of rays of light as they are related thereto and to the eyes of the subject.
Figure 2:
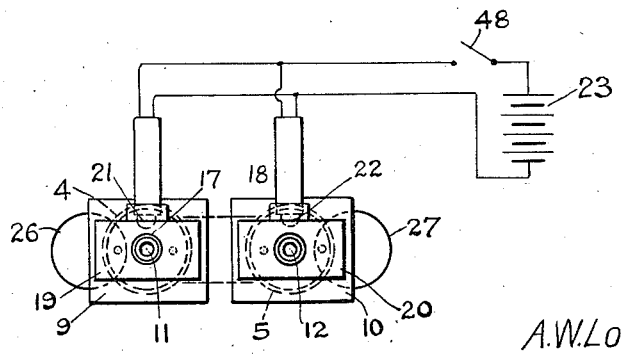
Figure 2 is a somewhat diagrammatic forward end view of the device.
Figure 3:
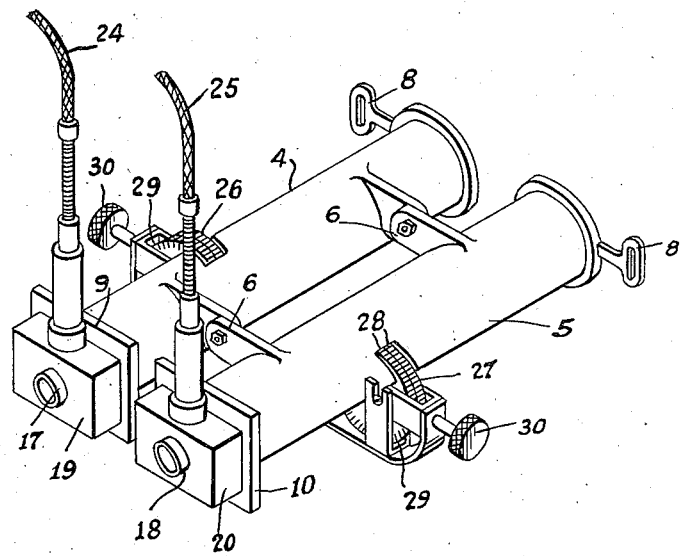
Figure 3 is a perspective view of the apparatus, from the forward end thereof.
Figure 4:
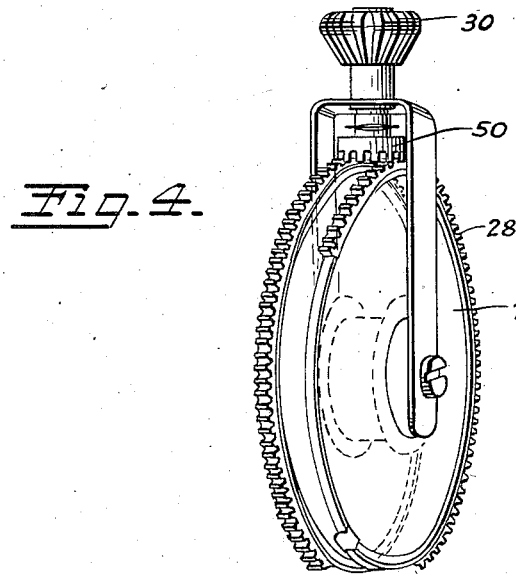
Figure 4 is a detail view of one of the rotatable double prisms and the means for rotating the same.

The barrels 4 and 5, for the right and the left eye respectively, are in general similar to those of a binocular field glass and are secured together by hinges 6 to permit of adjustment for interpupillary distance. Each barrel has in its ocular end a removable positive spherical lens 7 of six diopters to which is attached a tab 8 for convenience in handling the lens.

At the other ends of the barrels are the objective plates 9 and 10, respectively, in which are formed the central apertures 11 and 12, each five millimeters in diameter. One centimeter from the aperture 11 are one-millimeter apertures 13 and 14 and like openings 15 and 16 are formed on opposite sides of the aperture 12 in alignment with apertures 13 and 14. Tubes 17 and 18 are placed concentrically with apertures 11 and 12 and pass through the housings 19 and 20 whereof the plates 9 and 10 form one side of each. The purpose of the tubes 17 and 18 is to prevent light from the lamps 21 and 22 in the housings from reaching the openings 11 and 12 while permitting illumination of the apertures 13, 14, 15, and 16 thereby. Current is supplied by battery 23, the lamps being connected in parallel through cables 24 and 25 to obtain as nearly as possible uniform intensity in both of the lights.

Barrels 4 and 5 are each sixteen centimeters in length and three and one-half centimeters in diameter. Six centimeters from the objective plates 9 and 10 the barrels are slotted and double rotary prisms 26 and 27 are mounted in the slots to extend into the barrels to intercept the light rays from the openings 13 and 16. As will be seen from Figure 1 each member of the double rotary prisms is wedge shaped along a diameter, and the members of each pair are mounted to rotate about a common axis, in opposite directions. As an illustration of a means for rotating the prisms there are shown gear teeth 28 on the peripheries of the prisms and a knurled head 30 adapted to be turned to actuate a gear 50 engaged on its opposite sides with the teeth on the prisms, whereby one prism is rotated in one direction and the other in the opposite direction. Depending upon the direction of rotation, the prisms when turned will deflect the ray of light toward or away from the rays from the other apertures and in the same plane as those other rays. Each member of each double prism is a one-half diopter prism, and is graduated adjacent its periphery as indicated at 29 to indicate displacements up to one diopter in steps of one-twentieth diopter.

The operation is as follows:

The right and the left retinae are represented at 31 and 32, respectively, where the retinal images are formed. Ocular lenses 7 are removed and the subject places the instrument before his eyes as if it were a field glass. He then adjusts for interpupillary distance by looking at a distant object through openings 11 and 12 and moving the barrels on the hinges 6 until the openings appear to be superposed and form a single image at 33 on line 34. The ocular lenses are then replaced, their function being to eliminate accommodative effort and to place the eyes in a condition of rest.

If now the lights 21 and 22 are illuminated the openings 13, 14, 15 and 16 appear as points of light. It is to be noted that the apertures 11 and 12 are not lighted, due to the shielding effect of tubes 17 and 18; they are visible, however, and since the eyes were fixed upon them in the adjustment for interpupillary distance they aid in keeping the eyes in the same relative positions. The openings 13 and 15 are superposed and appear as a single image at 35 on line 34. Likewise, openings 14 and 16 are superposed and form a single image at 36. This is done with the prisms 26 and 27 in the neutral or zero position and they do not deflect the light that passes through them.

This apparatus thus furnishes a unitary and convenient optical equivalent of two distant points, which we may designate as 35 and 36, and it provides a means for intercepting and displacing at will the ray of light from the extreme right hand point to the right retina and from the extreme left hand point to the left retina, without affecting the ray from inner right hand point to the left retina or from the inner left hand point to the right retina.

As above mentioned, the points 33, 35 and 36 all appear to be at the same distance from the subject. If, now, the prism 27 in barrel 5 be operated to displace the ray from opening 16 outwardly to the retinal area 37 on retina 32, the displacement will be in the plane of the visual axes and therefore of the retinal areas 38 and 39. The significance of this fact has been discussed above. The retinal areas 37 and 38 are more widely separated than retinal areas 39 and 38. The specific nerve energy conveys to consciousness the fact of this wider separation so that the image appears to move to a position nearer to the subject, as indicated at 40 on line 41. If the ray from 13 be displaced inwardly to the retinal area 42 by manipulation of the prism 26 in barrel 4 the retinal areas 42 and 43 will be closer together than are the areas 43 and 44 and the image will appear to move to the point 45 on line 46, at a greater distance from the subject.

In measuring depth perception and simulating the faculty theerof, the examiner manipulates the prism 27 in barrel 5 to displace the left image 36 on line 34 to some position such as 40 on the line 41. The subject will note that the image 40 appears to be nearer than the image 35 on line 34. The subject then adjusts the prism 26 in barrel 4 until image 35 has moved to position 47 on line 41, or until it appears to be at the same distance as image 40. Any error in judging the distance will be shown by a difference in the readings on the scales of the double rotary prisms. One-tenth diopter corresponds to ten millimeters at six meters on the well known Howard-Dolman apparatus for measuring depth perception. A difference of readings up to 0.25 diopter is considered to be within normal limits.

Because of the speed that is usual in flying the aviator depends upon intermittent, of "flash", images for information concerning his surroundings. It is preferable, therefore, while conducting the above described test to flash the lights 21 and 22 intermittently, by means of the switch 48, allowing them to remain lighted for an interval of about two-fifths of a second. This simulates the flash imagery of flying and imposes a more rigid and accurate test upon the subject.

The invention herein described may be manufactured and used by or for the Government of the United States of America for governmental purposes without the payment of any royalties thereon or therefor.

I claim:

1. In a device of the class described, a pair of like tubular members, a closure for one end of each, each closure having a central aperture and equally spaced smaller apertures on opposite sides of each of said central apertures, all of said apertures being aligned, a housing secured to each closure, a tube disposed around each of said central apertures and extending through the respective housing, a source of light in each housing, a double rotary prism extending into each tubular member into the path of a ray of light from the outermost of the said smaller apertures opening into the respective said member, means to rotate the component prisms of each double prism in opposite directions, means to indicate the magnitude of any rotation thereof, and an ocular lens in the opposite end of each of said members.

2. In a device of the class described, a pair of like tubular members, a closure for one end of each, each closure having a central aperture and equally spaced smaller apertures on opposite sides of each of said central apertures, all of said apertures being aligned, a housing secured to each closure, a tube disposed around each of said central apertures and extending through the respective housing, a source of light in each housing, a double rotary prism extending into each tubular member into the path of a ray of light from the outermost of the said smaller apertures opening into the respective said member, means to rotate the component prisms of each double prism in opposite directions, and means to indicate the magnitude of any rotation thereof.

3. In a device of the class described, a pair of like tubulalr members, a closure for one end of each, each closure having a central aperture and equally spaced smaller apertures on opposite sides of each of said central apertures, the centers of all of said apertures lying in a common plane, means to illuminate said smaller apertures, adjustable means to deflect a ray of light from either of the outermost of said smaller apertures in the said common plane, and means to indicate the magnitude of any adjustment of said means.

4. In a device of the class described, a pair of like tubular members, a closure for one end of each, each closure having a central aperture and equally spaced smaller apertures on opposite sides of each of said central apertures, all of said apertures being aligned, a housing secured to each closure, a tube disposed around each of said central apertures and extending through the respective housing, a source of light in each housing, adjustable means to deflect a ray of light from either of the outermost of said smaller apertures in the common plane of the centers of said apertures, and means to indicate the magnitude of any adjustment of said means.

5. In a device of the class described, means to provide two pairs of beams of light all in alignment, the beams of each pair being viewable by one eye of an observer and distinguishable as two beams two double rotating prisms so disposed that each double prism intercepts one beam of each of said pairs, the beams so intercepted being the outermost beam of each pair, and means to indicate the magnitude of any rotation of such prisms.

6. In a device for measuring the depth perception of a subject, four separate sources of light associated in pairs, means for projecting the rays from one of said pairs upon the retinae to form a single image, means for projecting the rays from the other of said pairs upon the retinae to form a second single image, means for deflecting one ray of said first mentioned pair in a plane parallel to the plane of the visual axes, means operable by the subject for deflecting one ray from said second mentioned pair in a plane parallel to the plane of the visual axes, and means for comparing the angles of deflection of the two deflected rays.

7. A method of measuring the depth perception of a subject, including the steps of stimulating the retinae of the subject with a pair of light rays, one ray to each retina, respectively, to form a single image, likewise stimulating the retinae with a second pair of rays to form a second single image at the same apparent distance from the subject as the first mentioned image, no light from any one area or point reaching both eyes deflecting one ray of the first mentioned pair through an angle parallel to the plane of the visual axes, deflecting one of the rays of the second pair through an angle parallel to the plane of the visual axes until the two said images again appear to the subject to be equidistant from the subject and comparing the angles of deflection of the deflected rays.

8. In a device of the class described, means to project a pair of beams of light to one eye only of an observer, like means to project a like pair of beams to the other eye only of said observer, all of said beams being in a common plane, means to displace in said plane one beam of one pair to cause the source thereof to appear to be at a different distance from the eye of an observer, means to displace the corresponding beam of the other pair to cause its source to appear to be at the same distance from the eye as the apparent distance of the source of the first mentioned displaced beam and means to compare the displacements of the two beams.

9. In a device of the class described, means to provide two pairs of beams of light all in transverse alignment, the components of each pair of beams being so disposed that the left outermost and right innermost beams are parallel, and the right outermost and left innermost beams are parallel, two double rotating prisms so disposed that each double rotating prism intercepts the outermost beam of each pair of beams, and means to indicate the magnitude of any rotation of such prisms.

10. In a device of the class described, means to provide two pairs of beams of light all in transverse alignment, the components of each pair of beams being so disposed that the left outermost and the right innermost beams are parallel, and the right outermost and the left innermost beams are parallel, means to deflect one beam of each pair in the common plane of the beams and means to indicate the magnitude of such deflection.

11. A method of increasing the depth perception sensitivity of the human eye, which comprises repeatedly following the procedure that includes the steps of stimulating the retinae of the subject with a pair of light rays, one ray to each retina, respectively, to form a single image, likewise stimulating the retinae with a second pair of rays to form a second single image at the same apparent distance from the subject as the first mentioned image, no light from any one area or point reaching both eyes, deflecting one ray of the first mentioned pair through an angle parallel to the plane of the visual axes, causing the subject to deflect one of the rays of the second pair through an angle parallel to the plane of the visual axes until the two said images again appear to the subject to be equidistant from the subject and comparing the angles of deflection of the deflected rays.

12. The method of measuring the depth perception of a subject, which comprises stimulating corresponding retinal zones of the two eyes of the subject by the optical equivalent of two equally remote distant points, no zone of stimulus being common to both eyes, displacing to a different spot in said retinal zone the ray of light giving rise to the image of one of said points in one of said eyes, displacing to a different spot in said retinal zone that ray of light to the other eye which gives rise therein to the image of the second of said equivalent points until the said points appear to the subject to be again equidistant, and comparing the displacements of the two displaced rays.

13. The method of increasing the depth perception of a subject, which comprises repeatedly following the steps of stimulating corresponding retinal zones in the eyes of said subject with two rays of light to each eye to give rise to two single images that are apparently equidistant, all of said rays being co-planar, deflecting in the common plane of said rays the ray that gives rise to one of said images on one retina, deflecting in the same plane the ray that gives rise to the other image on the other retina until the deflection of the second ray appears to the subject to be equal to the deflection of the first ray in magnitude and direction, and comparing the magnitude of deflection of the two rays.

ARTHUR W. LOY.